(12) United States Patent
Cho et al.

(10) Patent No.: US 11,794,570 B2
(45) Date of Patent: Oct. 24, 2023

(54) VEHICLE CANISTER DEVICE HAVING AUXILIARY CANISTER

(71) Applicants: Hyundai Motor Company, Seoul (KR); Kia Corporation, Seoul (KR); Korea Fuel-Tech Corporation, Anseong-si (KR)

(72) Inventors: Seong Cheol Cho, Seoul (KR); Sung Won Lee, Hwaseong-Si (KR); Tae Kyu Hwang, Pyeongtaek-Si (KR); Hyung Jun Bae, Anseong-Si (KR)

(73) Assignees: Hyundai Motor Company, Seoul (KR); Kia Corporation, Seoul (KR); Korea Fuel-Tech Corporation, Anseong-si (KR)

( * ) Notice: Subject to any disclaimer, the term of this patent is extended or adjusted under 35 U.S.C. 154(b) by 0 days.

(21) Appl. No.: 18/070,153

(22) Filed: Nov. 28, 2022

(65) Prior Publication Data
US 2023/0202292 A1 Jun. 29, 2023

(30) Foreign Application Priority Data
Dec. 23, 2021 (KR) .................... 10-2021-0185921

(51) Int. Cl.
*B60K 15/035* (2006.01)
*F02M 25/08* (2006.01)
*B01D 53/04* (2006.01)

(52) U.S. Cl.
CPC ........ *B60K 15/03504* (2013.01); *B01D 53/04* (2013.01); *F02M 25/0854* (2013.01); *B01D 2253/102* (2013.01); *B01D 2259/4516* (2013.01)

(58) Field of Classification Search
CPC ............ F02D 41/0032; F02M 25/0836; F02M 25/0854
USPC .......................................................... 123/519
See application file for complete search history.

(56) References Cited

U.S. PATENT DOCUMENTS

| | | | | |
|---|---|---|---|---|
| 5,207,808 A | * | 5/1993 | Haruta | F02M 25/0854 96/132 |
| 5,839,421 A | * | 11/1998 | Suzuki | B60H 1/3208 123/698 |
| 5,906,189 A | * | 5/1999 | Mukai | F02M 25/089 123/519 |
| 5,914,457 A | * | 6/1999 | Itakura | F02M 25/0854 95/146 |
| 7,097,697 B2 | * | 8/2006 | Nakamura | F02M 25/0854 96/147 |

(Continued)

*Primary Examiner* — John Kwon
(74) *Attorney, Agent, or Firm* — MORGAN, LEWIS & BOCKIUS LLP

(57) ABSTRACT

A vehicle canister device includes a main canister including an inlet port through which evaporative gas is introduced from a fuel tank, an outlet port through which the evaporative gas introduced during operation of an engine is discharged to an intake side of the engine, and an internal space for filling activated carbon. The vehicle canister device also includes an auxiliary canister mounted in fluid-communication with the main canister and configured to allow external air to flow into the main canister through an atmosphere port provided on the main canister or the evaporative gas to flow therethrough upon stop of the engine. The auxiliary canister includes a plurality of activated carbon layers each filled with an activated carbon and a plurality of air layers disposed between the activated carbon layers.

6 Claims, 7 Drawing Sheets

(56) References Cited

U.S. PATENT DOCUMENTS

| | | | | |
|---|---|---|---|---|
| 7,458,367 B2* | 12/2008 | Kasuya | F02M 25/0854 | 123/519 |
| 7,841,321 B2* | 11/2010 | Kosugi | F02M 25/0854 | 123/519 |
| 7,909,919 B2* | 3/2011 | Kosugi | B01D 53/0407 | 55/498 |
| 9,005,352 B2* | 4/2015 | Mani | F02M 25/0854 | 96/132 |
| 2001/0020418 A1* | 9/2001 | Yamafuji | F02M 25/0854 | 96/132 |
| 2005/0081717 A1* | 4/2005 | Meiller | B01D 53/0446 | 96/154 |
| 2005/0217645 A1* | 10/2005 | Fukaya | F02M 25/089 | 123/519 |
| 2009/0151706 A1* | 6/2009 | Makino | F02M 25/0854 | 123/519 |
| 2010/0095938 A1* | 4/2010 | Kosugi | B60K 15/03504 | 123/519 |
| 2011/0315126 A1* | 12/2011 | Yoshida | F02M 25/0854 | 123/519 |
| 2012/0234301 A1* | 9/2012 | Takamatsu | F02M 25/0854 | 123/519 |
| 2013/0284154 A1* | 10/2013 | Makino | F02M 25/0854 | 123/519 |
| 2013/0340724 A1* | 12/2013 | Nakano | F02M 25/0854 | 123/519 |
| 2015/0107561 A1* | 4/2015 | Makino | F02M 25/0854 | 123/519 |
| 2015/0176540 A1* | 6/2015 | Danielowski | F02M 25/0854 | 123/519 |
| 2015/0275727 A1* | 10/2015 | Hiltzik | B01J 20/20 | 95/143 |
| 2017/0175682 A1* | 6/2017 | Omichi | B01D 53/0407 | |
| 2018/0363594 A1* | 12/2018 | Byrne | F02M 25/0854 | |
| 2021/0317803 A1* | 10/2021 | Cronin | F02M 35/10222 | |

* cited by examiner

VEHICLE CANISTER DEVICE HAVING AUXILIARY CANISTER

CROSS-REFERENCE TO RELATED APPLICATION

The present application claims priority to Korean Patent Application No. 10-2021-0185921 filed on Dec. 23, 2021, the entire contents of which is incorporated herein for all purposes by this reference.

BACKGROUND OF THE PRESENT DISCLOSURE

Field of the Present Disclosure

The present disclosure relates to a vehicle canister device having a built-in auxiliary canister, and more particularly, to a vehicle canister device having a built-in canister in which a structure having a combination of activated carbon layers each containing activated carbon and air layers is applied to reduce the ventilation resistance and to control the concentration of bleed emission.

Description of Related Art

In general, the vehicle industry has been conducting a lot of research to improve exhaust gas issues, and in particular, in order to minimize the emission of hydrocarbon (HC) in the evaporative gas component of gasoline fuel, many countries are applying constraint regulations to reduce the total amount of evaporative gas to 0.5 g/day or less, and are eventually planning to gradually reduce the total amount of evaporative gas to 0.054 g/day or less.

Recently, to conform to the regulatory regulations, on the one hand, a material and a connection structure of a fuel tank have been improved and optimized to minimize the generation of fuel evaporative gas passing through the fuel tank, and on the other hand, a fuel evaporative gas recirculation system in which a canister is applied to a fuel supply apparatus is being applied.

Such a canister contains an adsorbent material capable of absorbing the hydrocarbon of fuel evaporative gas from a fuel tank storing volatile fuel, and is connected to the fuel tank and collects fuel evaporative gas to prevent the fuel evaporative gas that evaporates from a float chamber and a fuel tank from being released into the atmosphere.

Accordingly, the fuel evaporative gas collected in the canister is introduced back into an engine through a Purge Control Solenoid Valve (PCSV) controlled by an engine control unit (ECU) and is combusted therein to recirculate the fuel evaporative gas.

In general, the canister has a canister body having an internal space filled with activated carbon, which functions to adsorb hydrocarbons of the fuel evaporative gas collected by the canister body.

The canister body is provided with a purge port connected to an intake passage of an internal combustion engine so that the collected fuel evaporative gas flows to the engine side therethrough, a loading port connected to a fuel tank so that the fuel evaporative gas is introduced, and an atmosphere port connected to an air filter so that the evaporative gas is discharged to the atmosphere therethrough, wherein the purge port, the loading port, and the atmosphere port are divided by partition walls formed in the internal space of the canister body.

In the canister configured as described above, hydrocarbons are adsorbed by activated carbon while the fuel evaporative gas that was introduced through the loading port is passing through the activated carbon in the internal space divided by the partition walls, and then the hydrocarbons-adsorbed fuel evaporative gas flows back into the engine through the loading port or is discharged to the atmosphere through the atmosphere port.

However, although such a canister improves the performance of collecting the evaporative gas, there is a problem in that when foreign substances are excessively adsorbed by the activated carbon, the ventilation resistance increases so that a bleed emission occurs that the evaporative gas which is not adsorbed in a main canister is discharged to the atmosphere through an auxiliary canister as it is.

The information included in this Background of the present disclosure is only for enhancement of understanding of the general background of the present disclosure and may not be taken as an acknowledgement or any form of suggestion that this information forms the prior art already known to a person skilled in the art.

BRIEF SUMMARY

Various aspects of the present disclosure are directed to providing a vehicle canister device including a built-in auxiliary canister in which activated carbon layers each including activated carbon and hollow air layers including no activated carbon are alternately disposed to reduce ventilation resistance and facilitate adsorption and desorption of evaporative gas so that a concentration of bleed emission is regulated and thermal interference between the activated carbon layers is minimized through the arrangement structure of the activated carbon layers and the air layers, increasing the purge efficiency.

According to various aspects of the present disclosure, there is provided a vehicle canister device including: a main canister including an inlet port through which evaporative gas is introduced from a fuel tank, an outlet port through which the evaporative gas introduced during operation of an engine is discharged to an intake side of the engine, and an internal space for filling an activated carbon; and an auxiliary canister mounted in fluid-communication with the main canister and configured to allow external air to flow into the main canister through an atmosphere port provided on the main canister or the evaporative gas to flow therethrough upon stop of the engine, wherein the auxiliary canister includes a plurality of activated carbon layers each filled with an activated carbon and a plurality of air layers disposed between the activated carbon layers.

Here, in the auxiliary canister, the activated carbon layers and the air layers may be continuously alternately-disposed.

Furthermore, in the auxiliary canister, continuously disposed activated carbon layers may be disposed between the air layers, or continuously disposed air layers may be disposed between the activated carbon layers.

Furthermore, the activated carbon layer may be filled with the activated carbon therein, and may include a plurality of coupling grooves and a plurality of coupling members on first and second sides thereof, respectively.

The air layer may be provided with a hollow space therein and a shape identical to that of the activated carbon layer and may be coupled to, or decoupled from, via engagements of the coupling grooves and the coupling members, the activated carbon layers disposed forward and rearward thereof.

On the other hand, the air layer may be provided with a guide partition wall member formed to protrude along an internal circumferential surface thereof to limit a flow path for the evaporative gas flowing toward the activated carbon layers.

Here, the guide partition wall member may have a height raised from the air layer, the height being determined as a difference between the whole height of an internal circumferential surface of the activated carbon layer and a lowest height of the activated carbon filled in the activated carbon layers in a gravitational direction thereof.

According to an exemplary embodiment of the present disclosure, activated carbon layers each including activated carbon and hollow air layers including no activated carbon are alternately disposed to reduce ventilation resistance and prevent the non-adsorbed evaporative gas from passing through the auxiliary canister as it is so that a concentration of bleed emission is regulated and at the same time, thermal interference between the activated carbon layers is minimized through the arrangement structure of the activated carbon layers and the air layers, increasing the purge efficiency.

Furthermore, according to an exemplary embodiment of the present disclosure, the activated carbon layers and the air layers are selectively disposed in an alternating manner or overlapping manner according to vehicle specifications, or conditions of use, such as surrounding environments and regulations, increasing the purge performance.

Furthermore, according to an exemplary embodiment of the present disclosure, the bypass-barrier partition wall is formed on the internal circumferential surface of the air layer and the activated carbon layers and the air layers are alternately disposed so that even when the activated carbon filled in the activated carbon layer is unevenly distributed by an uncontrollable force such as gravity, the evaporative gas is guided passing through the activated carbon by the bypass-barrier partition wall, preventing the problem of the evaporative gas being discharged in an non-adsorbed state.

The methods and apparatuses of the present disclosure have other features and advantages which will be apparent from or are set forth in more detail in the accompanying drawings, which are incorporated herein, and the following Detailed Description, which together serve to explain certain principles of the present disclosure.

Figure 1:
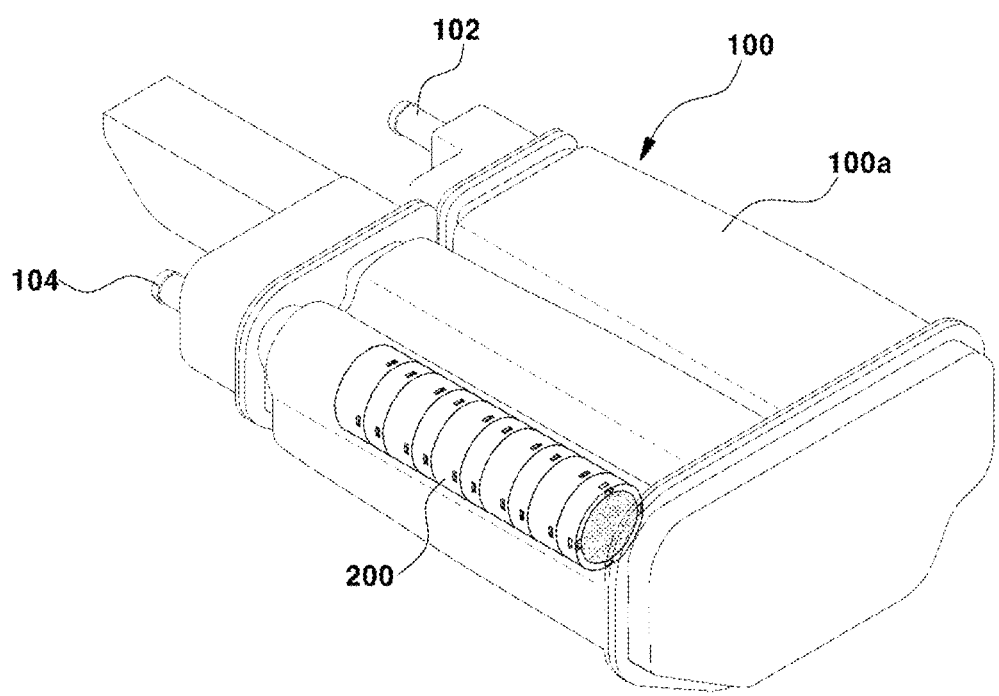
FIG. 1 is a view exemplarily illustrating a vehicle canister device including a built-in auxiliary canister according to various exemplary embodiments of the present disclosure.

It may be understood that the appended drawings are not necessarily to scale, presenting a somewhat simplified representation of various features illustrative of the basic principles of the present disclosure. The specific design features of the present disclosure as included herein, including, for example, specific dimensions, orientations, locations, and shapes will be determined in part by the particularly intended application and use environment.

In the figures, reference numbers refer to a same or equivalent parts of the present disclosure throughout the several figures of the drawing.

DETAILED DESCRIPTION

Reference will now be made in detail to various embodiments of the present disclosure(s), examples of which are illustrated in the accompanying drawings and described below. While the present disclosure(s) will be described in conjunction with exemplary embodiments of the present disclosure, it will be understood that the present description is not intended to limit the present disclosure(s) to those exemplary embodiments of the present disclosure. On the other hand, the present disclosure(s) is/are intended to cover not only the exemplary embodiments of the present disclosure, but also various alternatives, modifications, equivalents and other embodiments, which may be included within the spirit and scope of the present disclosure as defined by the appended claims.

Hereinafter, exemplary embodiments of the present disclosure will be described in detail with reference to the accompanying drawings.

Advantages and features of the present disclosure and a method for achieving the same will become apparent with reference to the exemplary embodiments described below in detail However, the present disclosure is not limited to the exemplary embodiments included below, but will be implemented in a variety of different forms, and only these embodiments are provided to allow the present disclosure of the present disclosure to be complete, and to fully inform an ordinary skilled in the art, to which an exemplary embodiment of the present disclosure pertains, of the scope of the present disclosure, which is only defined by the scope of the claims.

Furthermore, in the description of the present disclosure, when it is determined that related known techniques may obscure the gist of the present disclosure, a detailed description thereof will be omitted.

Figure 2:
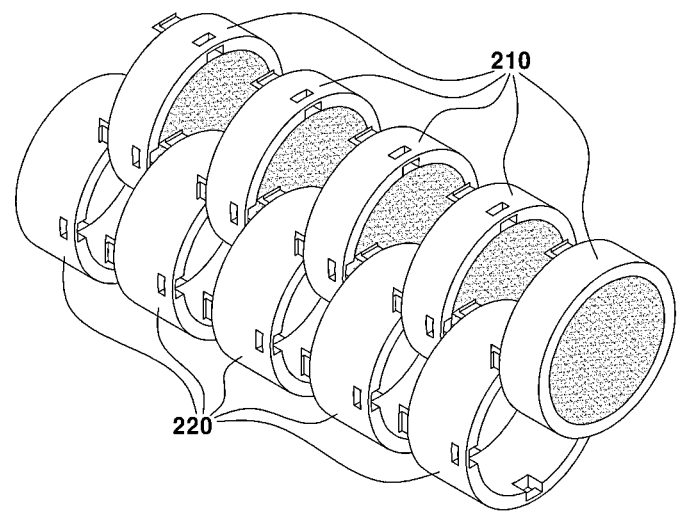
FIG. 2 is a view exemplarily illustrating the auxiliary canister in the vehicle canister device according to various exemplary embodiments of the present disclosure.
Figure 3:
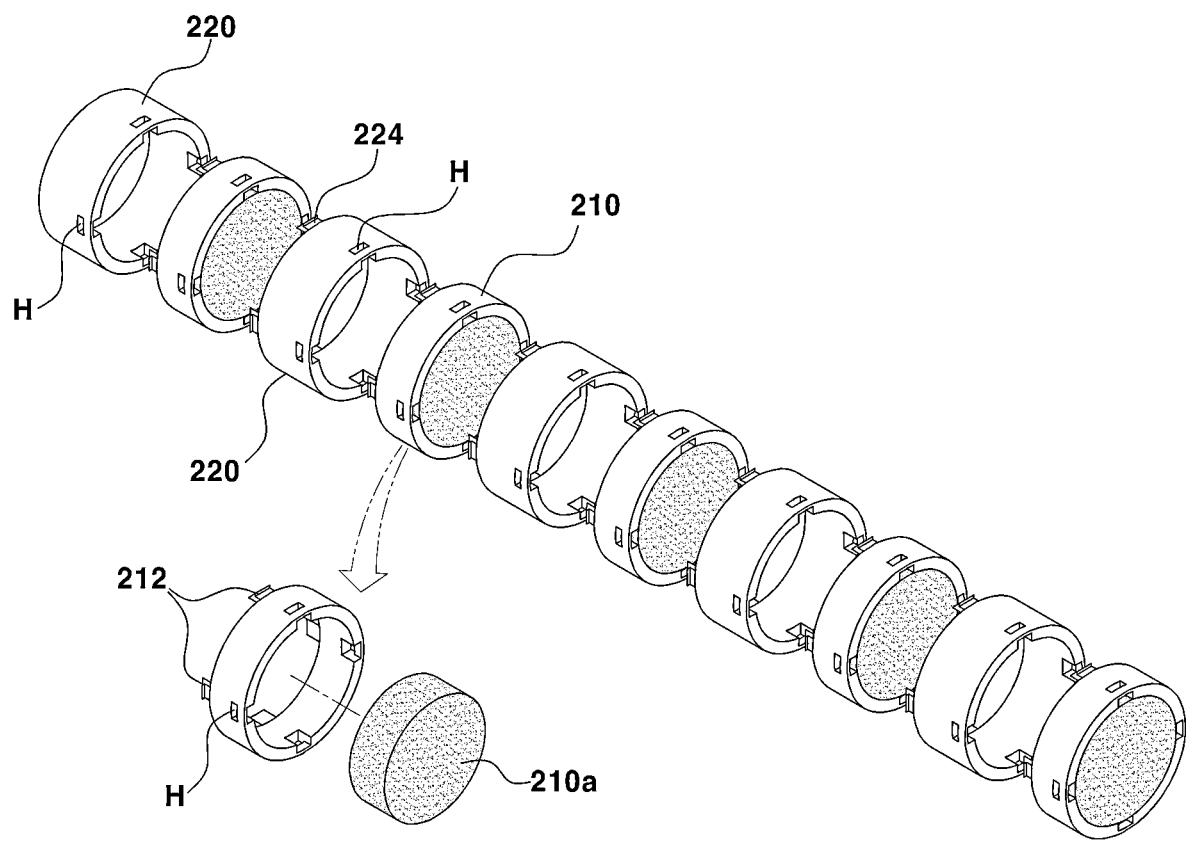
FIG. 3 is a view exemplarily illustrating the state in which the auxiliary canister is detached from the vehicle canister device according to various exemplary embodiments of the present disclosure.

FIG. 1 is a view exemplarily illustrating a vehicle canister device including a built-in auxiliary canister according to various exemplary embodiments of the present disclosure, FIG. 2 is a view exemplarily illustrating the auxiliary canister in the vehicle canister device according to various exemplary embodiments of the present disclosure, and FIG. 3 is a view exemplarily illustrating the state in which the auxiliary canister is detached from the vehicle canister device according to various exemplary embodiments of the present disclosure.

Figure 4A:
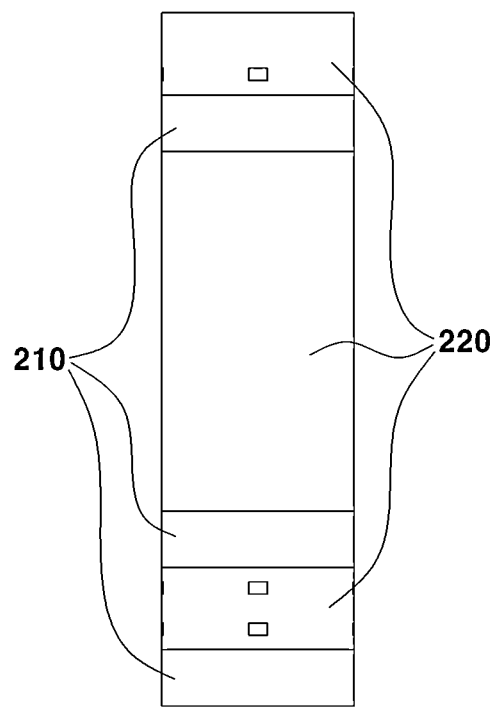
FIG. 4A and FIG. 4B are diagrams illustrating auxiliary canisters in the vehicle canister device according to other embodiments of the present disclosure.
Figure 4B:
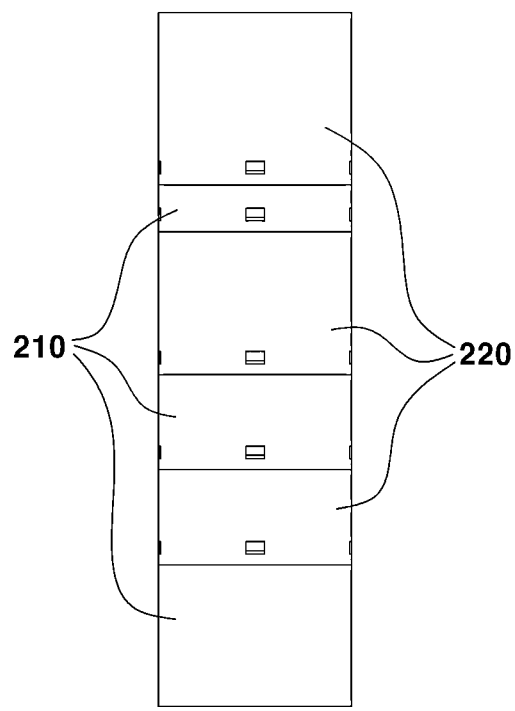
Figure 5A:
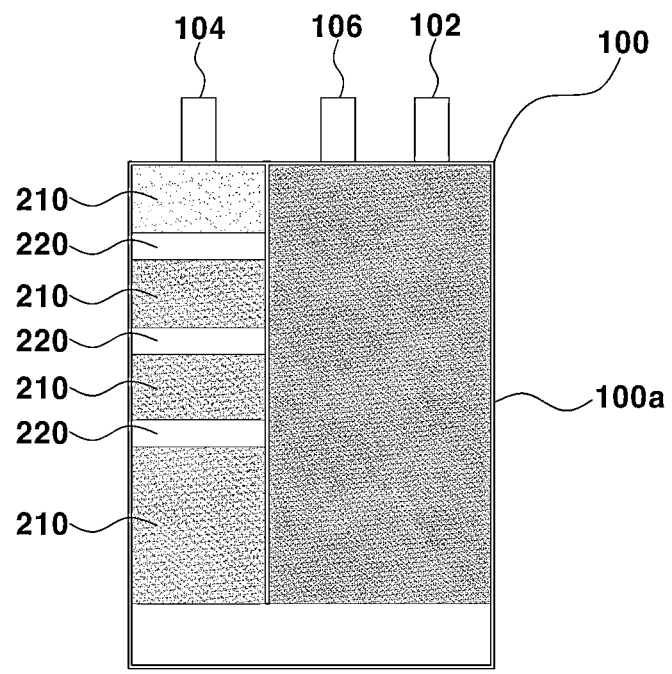
FIG. 5A and FIG. 5B are diagrams illustrating a temperature change during loading and purging of the vehicle canister device according to the exemplary embodiment of the present disclosure.
Figure 5B:
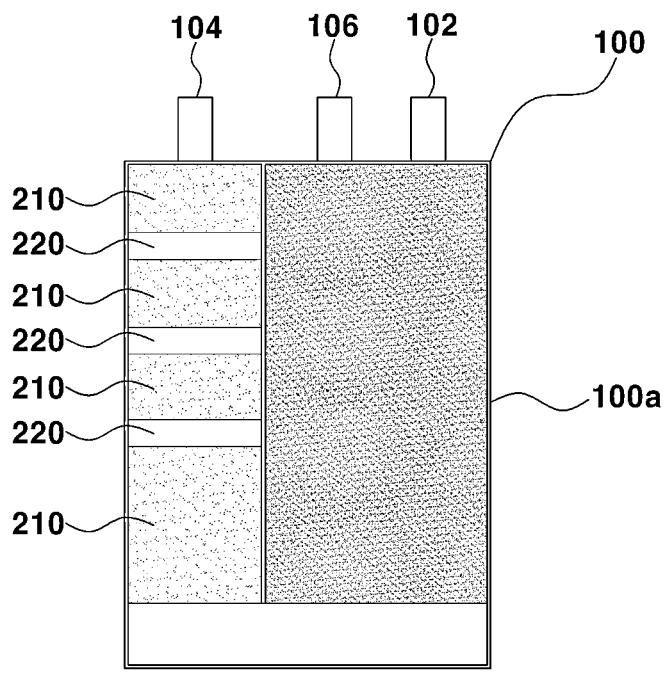

Furthermore, FIG. 4A and FIG. 4B are diagrams illustrating auxiliary canisters in the vehicle canister device according to other embodiments of the present disclosure, and FIG. 5A and FIG. 5B are diagrams illustrating a temperature change during loading and purging of the vehicle canister device according to the exemplary embodiment of the present disclosure.

Figure 6A:
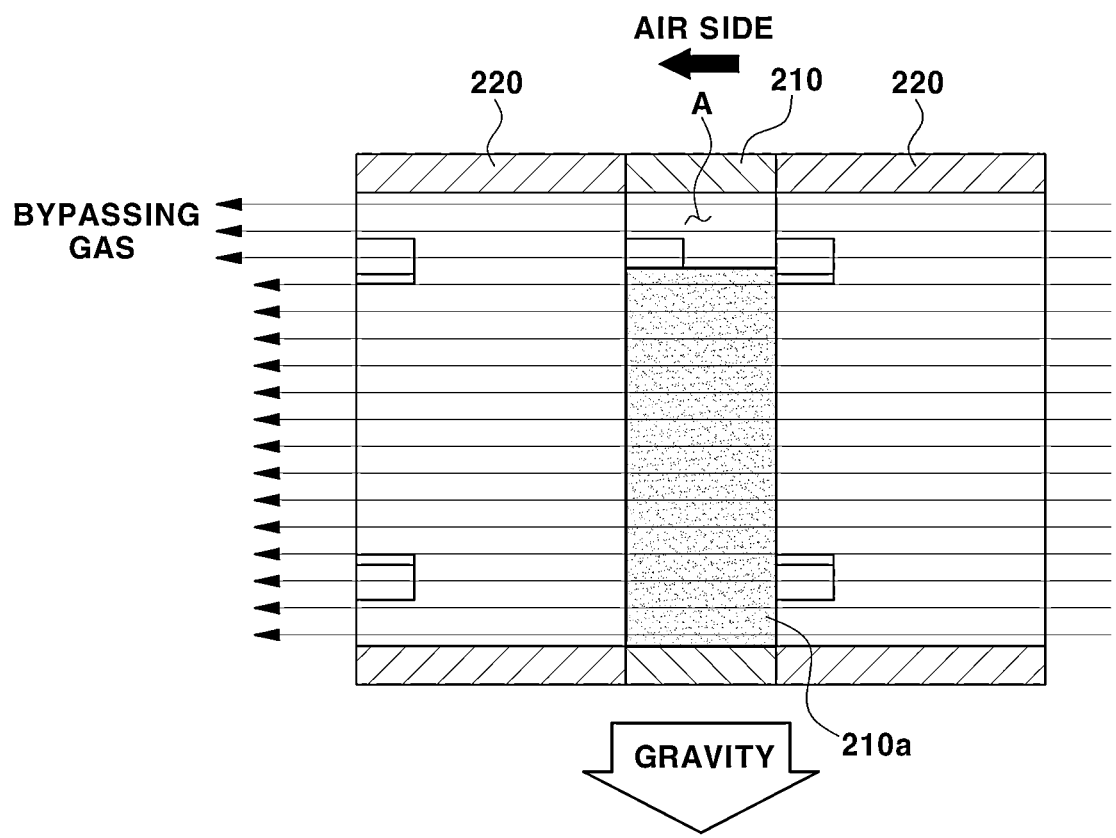
FIG. 6A and FIG. 6B are diagrams illustrating a conventional problem of the vehicle canister device according to the exemplary embodiment of the present disclosure.
Figure 6B:
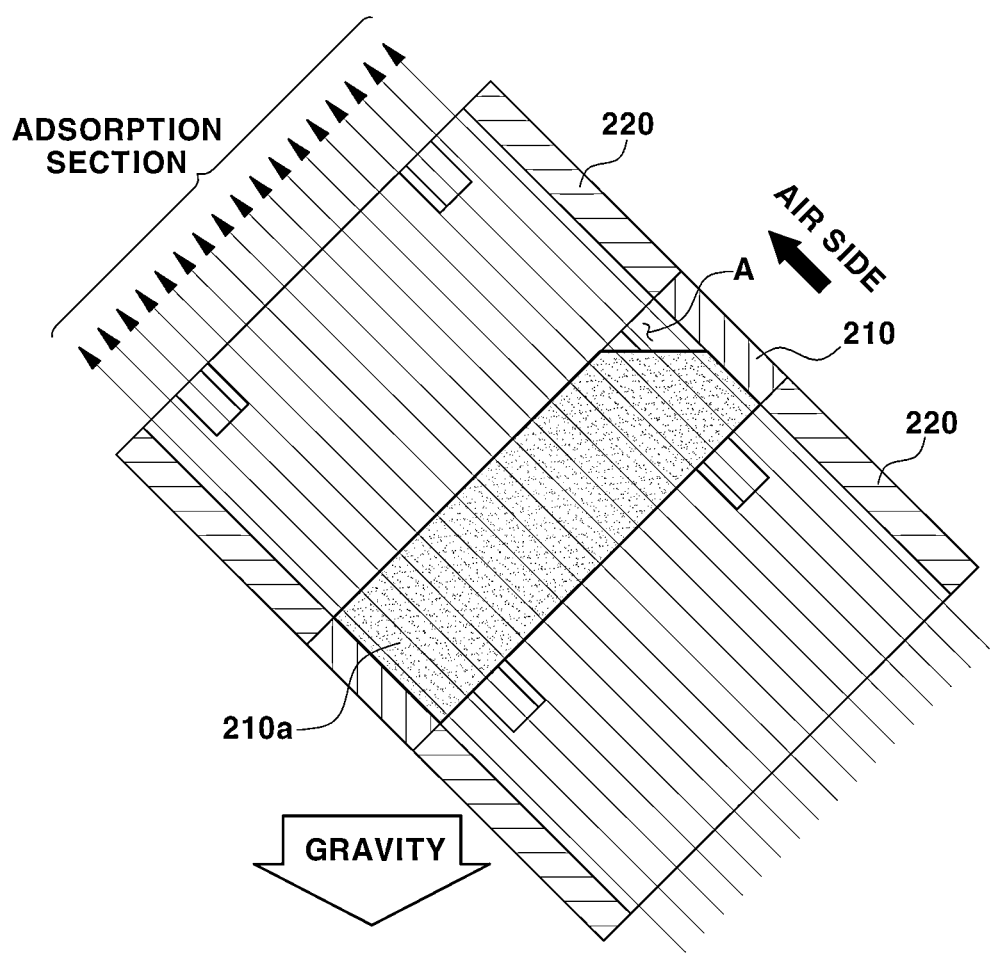
Figure 7:
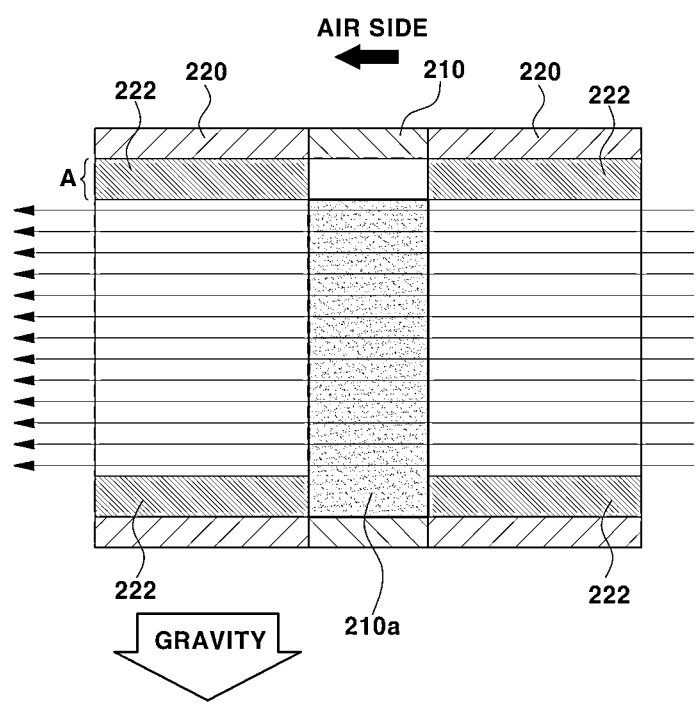
FIG. 7 is a view exemplarily illustrating a guide partition wall member for the vehicle canister device according to various exemplary embodiments of the present disclosure.

Furthermore, FIG. 6A and FIG. 6B are diagrams illustrating a conventional problem of the vehicle canister device according to the exemplary embodiment of the present disclosure, and FIG. 7 is a view exemplarily illustrating a guide partition wall member for the vehicle canister device according to various exemplary embodiments of the present disclosure.

As illustrated in FIG. 1, the vehicle canister device including the built-in auxiliary canister according to the exemplary embodiment includes a main canister 100 and an auxiliary canister 200.

In general, gasoline filled in a fuel tank is fed to an engine by a fuel pump, and the unused fuel in the engine is fed back to the fuel tank.

In the present way, the fuel fed back to the fuel tank receives heat from the engine and increases in temperature when the engine is driven. When the temperature around the vehicle rises to a high temperature, such as in summer, the temperature of gasoline in the fuel tank further increases.

Accordingly, when the gasoline temperature increases in the fuel tank, harmful gases such as hydrocarbons (HC) are generated, which flow to the outside of the fuel tank along a pipe line coupled to the fuel tank. The canister plays the role of a storage tank that collects the harmful gases that escape to the outside.

The canister is configured to prevent fuel loss occurring in the fuel tank by adsorbing and storing the harmful evaporative gas, which is generated in the fuel tank, in the activated carbon in the canister when the engine does not operate, and feeding the evaporative gas adsorbed in the activated carbon and combusting the evaporative gas in the engine when the engine operates so that revolutions per minute (rpm) increases.

A conventional canister including the above functions includes a housing 100a filled with activated carbon, an inlet port 102 provided on the upper portion of the housing 100a and through which the evaporative gas, which is a harmful gas, is introduced from a fuel tank, an outlet port 106 through which the evaporative gas is discharged to the intake side of an engine during operation of the engine, and an atmosphere port 104 configured to allow external air to be introduced into a main canister 100, or the evaporative gas adsorbed in the activated carbon to be discharged to the outside during engine stop.

The housing 100a may include a main canister 100 that adsorbs and stores the evaporative gas, and an auxiliary canister 200 that prevents the evaporative which is not adsorbed by the main canister from being discharged to the outside.

Furthermore, the main canister 100 and the auxiliary canister 200 may be provided to communicate with each other, the inlet port 102 and the outlet port 106 may be formed in the main canister 100, and the atmosphere port 104 may be formed in the auxiliary canister 200.

That is, in general, the canister includes the main canister 100 and the auxiliary canister 200, so that the main canister 100 is configured to collect most of the evaporative gas, and the auxiliary canister 200 is configured to collect a portion of the evaporative gas which is not collected in the main canister 100, and introduce external air toward the canister, that is, into the housing 100a through the atmosphere port 104.

However, although, in such a canister, to improve the evaporative gas collection performance and minimize the evaporative gas discharge to the outside thereof, the auxiliary canister 200 including the atmosphere port 104 formed therein may be filled with activated carbon 210a to increase the evaporative gas collection performance, there is a problem in that when foreign substances are excessively adsorbed by the activated carbon 210a, the ventilation resistance increases so that a bleed emission occurs that the evaporative gas which is not adsorbed in the main canister 100 is discharged to the atmosphere through the auxiliary canister 200 as it is.

To the present end, the auxiliary canister 200 according to the present exemplary embodiment has a structure in which a plurality of activated carbon layers 210 each filled with activated carbon 210a therein and a plurality of air layers 220 disposed between the activated carbon layers 210 are combined.

Here, in the auxiliary canister 200, as illustrated in FIG. 2, the activated carbon layers 210 and the air layers 220 may be continuously alternately disposed.

The auxiliary canister 200 has a structure in which the activated carbon layer 210 is disposed between the air layers 220 each including a hollow internal space, which facilitates the adsorption or desorption of the evaporative gas and effectively collects hydrocarbons contained in the evaporative gas, preventing an outflow of the evaporative gas in which hydrocarbons are not collected in advance.

That is, because the auxiliary canister 200 may be configured so that a plurality of air layers 220 are disposed between a plurality of activated carbon layers 210 each filled with activated carbon 210a therein to have a predetermined length along a direction perpendicular to the atmosphere port 104, the ventilation resistance for the evaporative gas may be reduced through the configuration of the air layers 220, and at the same time, the concentration of bleed emission may be decreased through effective collection of hydrocarbons using the activated carbon layers 210.

In the case of the arrangement structure of the auxiliary canister 200 as described above, that is, the structure in which the activated carbon layers 210 and the air layers 220 are alternately disposed, according to the vehicle specifications, the surrounding environment, regulations, etc., as illustrated in FIG. 4A and FIG. 4B, the activated carbon layers and the air layers may be disposed in an alternating manner or overlapping manner.

In other words, in the auxiliary canister 200, the activated carbon layers 210 continuously disposed in a predetermined length may be disposed between the air layers 220, or the air layers 220 continuously disposed in a predetermined length may be disposed between the activated carbon layers 210.

Typically, although during adsorption (loading) of hydrocarbons, the temperature of the housing 100a increases, such an increased temperature of the housing 100a degrades the adsorption (loading) performance of hydrocarbons.

Conversely, although during desorption (purge) of hydrocarbons, external air is introduced through the atmosphere port 104 so that the temperature of the housing 100a decreases, such a decreased temperature of the housing 100a degrades the desorption (purge) performance.

To the present end, during adsorbing or desorbing of hydrocarbons, thermal interference between adjacent to activated carbon layers 210 through the air layers 220 is minimized, that is, during adsorption (loading) of hydrocarbons, as illustrated in FIG. 5A, the activated carbon layer 210 adjacent to the atmosphere port 104 has relatively low thermal interference to minimize the performance degradation of hydrocarbon adsorption (loading), and during the desorption (purge) of hydrocarbons as illustrated in FIG. 5B, thermal interference with respect to respective activated carbon layers 210 is minimized, which can minimize the performance degradation of hydrocarbon desorption (purge).

Accordingly, in the present exemplary embodiment of the present disclosure, in consideration of the vehicle specifications, the surrounding environment, regulations, etc., for example, when it is necessary to minimize thermal interference for each activated carbon layer 210, as illustrated in FIG. 4A, the continuously disposed air layers 220 may be disposed between the activated carbon layers 210 to not only increase the desorption (purge) performance of hydrocarbons, but also prevent accumulation (residue) of the evaporative gas through decreased ventilation resistance.

The activated carbon layer 210 may be filled with the activated carbon therein as illustrated with enlarged view of FIG. 3, and may include a plurality of coupling grooves H on one side and a plurality of coupling members 212 provided at corresponding positions on the other side thereof.

The air layer 220 may be provided with a hollow internal space, and may include the same structure (including coupling grooves H and coupling members 224) as that of activated carbon layer 210 so that the air layer is coupled to or decoupled from the activated carbon layers 210 on the front and rear sides thereof through coupling or decoupling between the coupling grooves H and coupling members 212 of the air layer and the coupling members 224 and coupling grooves H of the activated carbon layers.

Here, the activated carbon layers 210 and the air layers 220 may each be continuously disposed in different lengths so that in consideration of vehicle specifications, surrounding environment, regulations, etc., the activated carbon layers 210 and the air layers 220 are continuously alternately disposed, the continuously disposed activated carbon layers 210 are disposed between the air layers 220, or the continuously disposed air layers 220 are disposed between the activated carbon layers 210 so that the activated carbon layers 210 and the air layers 220 may be selectively coupled through the coupling between the coupling grooves H and the coupling members 212 (see FIG. 4A and FIG. 4B).

On the other hand, as illustrated in FIG. 7, the air layer 220 may be provided with a guide partition wall member 222 formed to protrude along an internal circumferential surface thereof to limit a flow path for the evaporative gas flowing toward the activated carbon layer 210.

The guide partition wall member 222 is configured to prevent the evaporative gas flowing through the activated carbon layer 210 from bypassing the activated carbon layer so that hydrocarbons are not adsorbed, and may protrude a predetermined length from the internal circumferential surface of the air layer 220.

For example, when the housing 100a is inclined depending on the position of a vehicle as illustrated in FIG. 6A and FIG. 6B, or otherwise when the activated carbon 210a filled in the activated carbon layer 210 is biased in the direction of gravity within the activated carbon layer 210, a non-adsorption section A may occur.

Accordingly, when the non-adsorption section A occurs, the evaporative gas may bypass the activated carbon in a state in which hydrocarbons are not adsorbed while the evaporative gas flows along the activated carbon layer 210 and the air layer 220, so that the concentration of bleed emission may be increased.

Accordingly, in an exemplary embodiment of the present disclosure, the generation of the non-adsorption section A is expected and the guide partition wall member 222 is provided to shield the non-adsorption section A to limit a flow path of the bypassing evaporative gas, which makes it possible to control the bleed emission concentration to be reduced.

Here, the guide partition wall member 222 may have a height X which is determined as a difference between the whole height of an internal circumferential surface of the activated carbon layer 210 and a lowest height of the activated carbon 210a filled in the activated carbon layer 210, that is, a height of the activated carbon 210a from a lowest end portion thereof in a state in which the activated carbon is biased in the gravitational direction thereof. By predicting the height of the non-adsorption section A and setting the protrusion height of the guide partition wall member 222 from the air layer 220 to be the set height X as described above, it is possible to prevent the evaporative gas from bypassing the activated carbon layer 210 in advance.

According to an exemplary embodiment of the present disclosure, activated carbon layers each including activated carbon and hollow air layers including no activated carbon are alternately disposed to reduce ventilation resistance and prevent the non-adsorbed evaporative gas from passing through the auxiliary canister as it is so that a concentration of bleed emission is regulated and at the same time, thermal interference between the activated carbon layers is minimized through the arrangement structure of the activated carbon layers and the air layers, increasing the purge efficiency.

Furthermore, according to an exemplary embodiment of the present disclosure, the activated carbon layers and the air layers are selectively disposed in an alternating manner or overlapping manner according to vehicle specifications, or conditions of use, such as surrounding environments and regulations, increasing the purge performance.

Furthermore, according to an exemplary embodiment of the present disclosure, the bypass-barrier partition wall is formed on the internal circumferential surface of the air layer and the activated carbon layers and the air layers are alternately disposed so that even when the activated carbon filled in the activated carbon layer is unevenly distributed by an uncontrollable force such as gravity, the evaporative gas is guided passing through the activated carbon by the bypass-barrier partition wall, preventing the problem of the evaporative gas being discharged in an non-adsorbed state.

For convenience in explanation and accurate definition in the appended claims, the terms "upper", "lower", "inner", "outer", "up", "down", "upwards", "downwards", "front", "rear", "back", "inside", "outside", "inwardly", "outwardly", "interior", "exterior", "internal", "external", "forwards", and "backwards" are used to describe features of the exemplary embodiments with reference to the positions of such features as displayed in the figures. It will be further understood that the term "connect" or its derivatives refer both to direct and indirect connection.

The foregoing descriptions of specific exemplary embodiments of the present disclosure have been presented for purposes of illustration and description. They are not intended to be exhaustive or to limit the present disclosure to the precise forms disclosed, and obviously many modifications and variations are possible in light of the above teachings. The exemplary embodiments were chosen and described in order to explain certain principles of the invention and their practical application, to enable others skilled in the art to make and utilize various exemplary embodiments of the present disclosure, as well as various alternatives and modifications thereof. It is intended that the scope of the present disclosure be defined by the Claims appended hereto and their equivalents.

What is claimed is:

1. A vehicle canister apparatus comprising:
   a main canister including an inlet port through which evaporative gas is introduced from a fuel tank, an outlet port through which the evaporative gas introduced during operation of an engine is discharged to an intake side of the engine, and an internal space for filling an activated carbon; and
   an auxiliary canister mounted in fluid-communication with the main canister and configured to allow external air to flow into the main canister through an atmosphere port provided on the main canister or the evaporative gas to flow therethrough upon stop of the engine,
   wherein the auxiliary canister includes a plurality of activated carbon layers each filled with an activated carbon and a plurality of air layers disposed between the activated carbon layers,
   wherein the air layers are provided with a guide partition wall member formed to protrude along an internal circumferential surface thereof to limit a flow path for the evaporative gas flowing toward the activated carbon layers, and
   wherein the guide partition wall member has a height raised from the air layers, the height being determined as a difference between a whole height of an internal circumferential surface of the activated carbon layers and a lowest height of the activated carbon filled in the activated carbon layers in a gravitational direction.

2. The vehicle canister apparatus of claim 1, wherein in the auxiliary canister, the activated carbon layers and the air layers are continuously alternately-disposed.

3. The vehicle canister apparatus of claim 1, wherein in the auxiliary canister, continuously disposed activated carbon layers are disposed between the air layers, or continuously disposed air layers are disposed between the activated carbon layers.

4. The vehicle canister apparatus of claim 1, wherein each of the activated carbon layers is filled with the activated carbon therein.

5. The vehicle canister apparatus of claim 4, wherein the activated carbon layers include a plurality of coupling grooves and a plurality of coupling members on first and second sides thereof, respectively.

6. The vehicle canister apparatus of claim 5, wherein the air layers provided with a hollow space therein and a shape identical to a shape of the activated carbon layers, are coupled to or decoupled from, via engagements of the coupling grooves and the coupling members, the activated carbon layers disposed forward and rearward thereof.

* * * * *